(12) United States Patent
Behrendt

(10) Patent No.: US 10,232,704 B2
(45) Date of Patent: Mar. 19, 2019

(54) METHOD FOR INCREASING THE ACCURACY OF PRESSURE DETECTION WITHOUT USING A SENSOR

(71) Applicant: Continental Automotive GmbH, Hannover (DE)

(72) Inventor: Gerald Behrendt, Frankfurt am Main (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/569,029

(22) PCT Filed: Apr. 25, 2016

(86) PCT No.: PCT/EP2016/059161
§ 371 (c)(1),
(2) Date: Oct. 24, 2017

(87) PCT Pub. No.: WO2016/173980
PCT Pub. Date: Nov. 3, 2016

(65) Prior Publication Data
US 2018/0126844 A1    May 10, 2018

(30) Foreign Application Priority Data
Apr. 27, 2015  (DE) .................. 10 2015 207 710

(51) Int. Cl.
*F02D 41/30* (2006.01)
*B60K 15/07* (2006.01)
(Continued)

(52) U.S. Cl.
CPC ........ *B60K 15/077* (2013.01); *F02D 41/3082* (2013.01); *F02M 37/08* (2013.01);
(Continued)

(58) Field of Classification Search
CPC ........ F02D 29/06; F02D 31/001; F02D 41/22; F02D 41/221; F02D 41/2438;
(Continued)

(56) References Cited

U.S. PATENT DOCUMENTS

| | | | |
|---|---|---|---|
| 5,505,180 A * | 4/1996 | Otterman | F02D 41/2464 123/497 |
| 5,609,140 A | 3/1997 | Kramer et al. | |
| 5,761,627 A * | 6/1998 | Seidel | B62D 5/065 180/442 |
| 6,913,558 B2 * | 7/2005 | Mori | B60K 6/485 180/65.26 |

(Continued)

FOREIGN PATENT DOCUMENTS

| | | |
|---|---|---|
| DE | 38 35 672 A1 | 4/1990 |
| DE | 197 42 993 A1 | 4/1991 |

(Continued)

*Primary Examiner* — Hung Q Nguyen
*Assistant Examiner* — Johnny H Hoang
(74) *Attorney, Agent, or Firm* — Cozen O'Connor

(57) ABSTRACT

A method for determining a pressure value in a fluid conveying system of a motor vehicle, the vehicle having an actuable electric motor and having a fluid feed pump drivable by the electric motor, includes: determining a rotational speed of the electric motor; determining an actuation current of the electric motor; acquiring a pressure value as a function of the determined rotational speed and the determined actuation current of the electric motor; processing the acquired pressure value with at least one external state variable in a controller; and correcting the acquired pressure value.

11 Claims, 1 Drawing Sheet

(51) Int. Cl.
*B60K 15/077* (2006.01)
*F04D 15/00* (2006.01)
*F04B 49/06* (2006.01)
*F02M 37/08* (2006.01)
*B60K 15/03* (2006.01)

(52) U.S. Cl.
CPC ........ *F04B 49/065* (2013.01); *F04D 15/0088* (2013.01); *B60K 2015/03243* (2013.01); *F04B 2203/0201* (2013.01); *F04B 2203/0209* (2013.01); *F04B 2205/05* (2013.01); *F05D 2260/821* (2013.01); *F05D 2270/304* (2013.01); *F05D 2270/335* (2013.01)

(58) Field of Classification Search
CPC ........... F02D 41/2464; F02D 2011/104; F02D 2041/2027; B60K 15/077
USPC ................ 701/102, 104, 107, 110, 114, 115; 123/196 S, 198 D, 479, 480, 497
See application file for complete search history.

(56) References Cited

U.S. PATENT DOCUMENTS

| | | | |
|---|---|---|---|
| 8,707,932 B1* | 4/2014 | Marin | F02D 41/3082 |
| | | | 123/479 |
| 9,127,611 B2 | 9/2015 | Graf | |
| 2008/0255744 A1* | 10/2008 | Yasui | B60T 8/1755 |
| | | | 701/70 |
| 2013/0319366 A1* | 12/2013 | Karasawa | F01M 1/02 |
| | | | 123/196 R |
| 2014/0105758 A1 | 4/2014 | Sausner et al. | |

FOREIGN PATENT DOCUMENTS

| | | |
|---|---|---|
| DE | 44 46 277 A1 | 6/1996 |
| DE | 199 35 237 A1 | 2/2001 |
| DE | 10 2008 043 127 A1 | 4/2010 |
| DE | 10 2010 041 773 A1 | 4/2012 |
| DE | 10 2011 015 154 A1 | 9/2012 |
| EP | 1 637 723 A1 | 3/2006 |

* cited by examiner

METHOD FOR INCREASING THE ACCURACY OF PRESSURE DETECTION WITHOUT USING A SENSOR

CROSS-REFERENCE TO RELATED APPLICATIONS

This is a U.S. national stage of application No. PCT/EP2016/059161, filed on 25 Apr. 2016, which claims priority to the German Application No. 10 2015 207 710.1 filed 27 Apr. 2015, the content of both incorporated herein by reference.

BACKGROUND OF THE INVENTION

1. Field of the Invention

The invention relates to a method for determining a pressure value in a fluid conveying system of a motor vehicle, having an actuable electric motor and having a fluid feed pump drivable by the electric motor.

2. Related Art

To better monitor and regulate fuel feed pumps, a multiplicity of measurement variables are detected directly or indirectly in order to feed the suitable quantity of fuel at any time. In this context, in particular attention is paid to ensuring that the fuel is conveyed with the highest possible energy efficiency. This means that in each case only the quantity of fuel required at the current operating time is conveyed to keep the energy consumption of the fuel conveying system as low as possible. Fuel conveying systems of this type are used, for example, in motor vehicles driven by an internal combustion engine.

Furthermore an objective is to make the fuel conveying system as simple and cost-effective as possible and at the same time to keep, in particular, the number of individual components used as small as possible.

The prior art has disclosed a multiplicity of devices that provide a pressure sensor, or else a multi-function sensor, with pressure detection to be able to determine as accurately as possible the pressure of the fuel to be conveyed. Pressure sensors are, for this purpose, preferably arranged upstream of the fuel feed pump and/or downstream thereof, to be able to make as accurate a statement as possible about the pressure in the fuel to be conveyed.

Devices of this type are known, for example, from DE 38 35 672 A1, which discloses a method that relies on measured values of pressure sensors respectively arranged upstream and downstream of the fuel feed pump.

DE 199 35 237 B4 discloses a method for determining the load state of a fuel filter arranged downstream of a feed pump, wherein a pressure sensor is arranged downstream of the fuel filter.

A disadvantage with these methods known from the prior art is that at least one pressure sensor has to be provided in the fuel conveying system, as a result of which additional costs are entailed and the susceptibility of the system to fault is increased.

There are devices for overcoming these disadvantages which entirely dispense with a sensor for detecting a pressure and derive the pressure from other values or determine it from input variables by means of computing algorithms.

A disadvantage of these devices and the methods used is, in particular, that the accuracy of the acquisition of the pressure is not optimum and, in particular, the determination of the pressure is not optimum under extreme operating conditions such as, for example, extreme driving states.

SUMMARY OF THE INVENTION

An object of the present invention is therefore to provide a method that permits pressure to be detected with optimized accuracy and without using a sensor.

The term without using a sensor is always intended to mean in the context of the present invention here that a pressure sensor is dispensed with within the fuel conveying system. Other variables that are used, for example, to calculate or acquire the pressure can nevertheless be acquired with different sensors without being affected by this.

In accordance with one aspect of the invention a method is provided for determining a pressure value in a fluid conveying system of a motor vehicle, the motor vehicle having an actuable electric motor and having a fluid feed pump drivable by the electric motor, wherein the method includes:

determining a rotational speed of the electric motor,
determining an actuation current of the electric motor,
acquiring a pressure value as a function of the rotational speed and the actuation current of the electric motor,
processing the acquired pressure value with at least one external state variable in a control unit, and
correcting the acquired pressure value.

The term fluid conveying system can mean, for example, a fuel conveying system or alternatively a fluid conveying system for feeding an oil or a coolant. In the text which follows, embodiments of the invention will be described with reference to a fuel conveying system. However, a transfer to other fluid conveying systems of a motor vehicle is possible. In the case of a fuel conveying system the fluid feed pump is formed by a fuel feed pump.

The rotational speed can preferably be determined by a sensor or can alternatively be acquired from other manipulated variables within the fuel conveying system. The actuation current, which describes the current conducted by a controller assigned to the electric motor to the electric motor, can likewise be acquired by a sensor or in the course of a calculation.

Owing to the relationships between the actuation current and the rotational speed of the fuel feed pump or of the electric motor, it is also possible to infer the pressure prevailing in the fuel conveying system. However, the accuracy of the acquired pressure is dependent on the actual operating conditions of the fuel conveying system. The characteristic diagrams, characteristic curves and assumptions used for the acquisition or calculation also play a role. The acquisition of the pressure by a calculation or acquisition on the basis of the actuation current and the rotational speed are therefore subject to unavoidable errors.

In order to improve the result further, the acquired pressure value is preferably processed with an external state variable. An external state variable is here, in particular, a characteristic variable not associated directly with the fuel conveying system, such as, for example, a temperature, which was originally detected or calculated for a different purpose.

The term "processing" means, in particular, that the external state variable is also directly or indirectly included in the acquisition of the pressure value. There can also be provision for the acquired pressure value to be offset against the external state variable. The term processing can also mean that a comparison of the acquired pressure is made with the external state variable, in order, for example, to determine a plausibility of the pressure value or the true content of the pressure value.

The term correction of the pressure value can mean that depending on the processing the unchanged pressure value is retained or an adaptation in the upward or downward direction takes place. The correction is made here dependent, in particular, on the processing of the acquired pressure value with the external state variables.

It is also to be preferred if the actuation current of the electric motor is adapted by the controller as a function of the at least one external state variable and/or the acquired pressure value and/or the corrected pressure value.

The actuation current or the rotational speed of the electric motor can be adapted as a function of the result of the processing of the external state variable with the acquired pressure valve in order to increase or decrease the delivery capacity. The actual delivery capacity of the fuel feed pump can therefore preferably be adapted to the prevailing boundary conditions.

It is particularly advantageous if the external state variables are formed at least partially by measurement variables and/or calculated variables from other controllers and/or sensors of the motor vehicle.

Measurement variables are preferably used that are detected in any case by other sensors or subsystems installed in the motor vehicle. These include, in particular, temperature sensors, sensors for detecting the quality of the fuel, the position of the accelerator pedal, the gear or the like. These also include sensors required for the combustion in the internal combustion engine or the treatment of exhaust gases, such as for example the lambda probe, pressure sensors or air quantity meters and air mass flow meters.

Measurement variables that have already been processed by calculation operations or other methods can also be applied as external state variables in advantageous embodiments.

External state variables such as the rotational speed, the instantaneous or predicted fuel consumption or the torque of the internal combustion engine are particularly preferably used. Information about the state of the start/stop system or the position of the ignition are also preferred state variables. Alternatively, for example, the external temperature or the temperature of the high pressure pump responsible for conveying the high pressure of the fuel can also be used.

Furthermore, it is advantageous if the external state variables originate from models, wherein different external state variables can be output by the models as a function of predefinable input variables.

The external state variables can be obtained, in particular, from models stored in the vehicle electronics. The models can be models constructed, for example, for simulation purposes or other static and/or dynamic vehicle models. The models can preferably represent the entire vehicle in a model-like fashion or respectively only individual parts. It is possible to represent, in particular, different driving states in the models that permit statements to be made about specific state variables on the basis of a detected driving state. The models can themselves obtain input data from other controllers and/or sensors of the vehicle electronics. Stored characteristic diagrams can also be used to supply the models with input values.

In a preferred exemplary embodiment the model from which the external state variables originates corresponds to a characteristic diagram stored as an emergency running program for the vehicle.

In this context, an emergency running program is, in particular, a program that permits restricted operation of the motor vehicle if, for example, normal vehicle operation is not ensured as a result of fault messages or sensor failures. This includes, for example, an emergency running program for the internal combustion engine that is distinguished by the fact that a necessary quantity of fuel is calculated for fault-free operation on the basis of selected operating data of the internal combustion engine, and a necessary rotational speed of the fuel feed pump is derived therefrom. The regulation of the quantity of fuel is no longer optimum here but instead merely configured in such a way that damage-free operation is possible.

It is also to be preferred if the model is used to infer unknown variables from known variables, wherein the model has empirically acquired data records and/or data records acquired by simulation, to determine the unknown variables.

The model or models used respectively form a reduced representation of reality that outputs one or more output variables in response to a predefinition of defined input variables. For this purpose, very different working algorithms can be stored in the model.

Furthermore, it is advantageous if a limitation of the working range of the fuel conveying system is brought about on the basis of the comparison of the calculated pressure value with the external state variables.

In particular, the actuation current of the electric motor is limited, with respect both to the maximum value and to the minimum value, to ensure that the fuel feed pump is operated only in one operating range, in particular rotational speed range, which matches the respective driving situation.

In this way, the values acquired by the regulation of the pressure of the fuel feed pump without using a sensor for the rotational speed of the fuel feed pump or the actuation current can be checked. Unusual values that do not match the actual prevailing situation can therefore be detected, and operation of the fuel feed pump with an incorrect rotational speed and therefore an incorrect delivery volume can be avoided.

Furthermore, it is advantageous if the fuel conveying system is calibrated on the basis of the comparison of the external state variables with the acquired pressure value.

By detecting the external state variables it is possible for calibration operations which have, in particular, already taken place to be checked with respect to their quality, or correction values can be generated that bring about an improvement of the quality. This is advantageous, for example, if a temperature of the fuel of 20° is used as the basis for the acquisition of the pressure value in the fuel conveying system but the fuel currently has a higher temperature, for example 60°, as a result of which the fuel has different flow properties and therefore the acquisition of the pressure is influenced. The additional use of the external state variable permits situation-appropriate adaptation of the acquisition of the pressure values, as a result of which the regulation quality of the system is improved.

It is also expedient if at least one external state variable is input directly into the acquisition of the pressure value. An external state variable that directly influences, for example, the rotational speed or the actuation current of the electric motor can be used particularly advantageously to determine the pressure value directly. This can be, for example, the ethanol content of the fuel, which can be detected by means of the lambda probe.

Moreover, it is advantageous if at least one external state variable is used to indirectly determine an internal state variable of the fuel conveying system.

For example, the external temperature can be used to predict, on the basis of the external temperature as a starting value, the temperature of the fuel in the fuel tank. For example, the temperature of the fuel feed pump and, in particular, the temperature of the winding of the electric motor can be inferred from the temperature of the fuel in the tank, as a result of which situation-optimized operation is made possible.

An internal state variable is here, in particular, a state variable that permits a statement about a specific element or component of the fuel conveying system, for example the electric motor or the fuel feed pump itself.

Furthermore, it is expedient if the acquired pressure value corresponds to the pressure in the fuel at the output of the fuel feed pump and/or at a location downstream of the fuel feed pump and/or at a location upstream of the fuel feed pump.

Advantageous developments of the present invention are described in the dependent claims and in the following description of the figures.

BRIEF DESCRIPTION OF THE DRAWINGS

In the text which follows, the invention will be explained in detail on the basis of exemplary embodiments and with reference to the drawings, in which.

DETAILED DESCRIPTION OF THE PRESENTLY PREFERRED EMBODIMENTS

Figure 1:
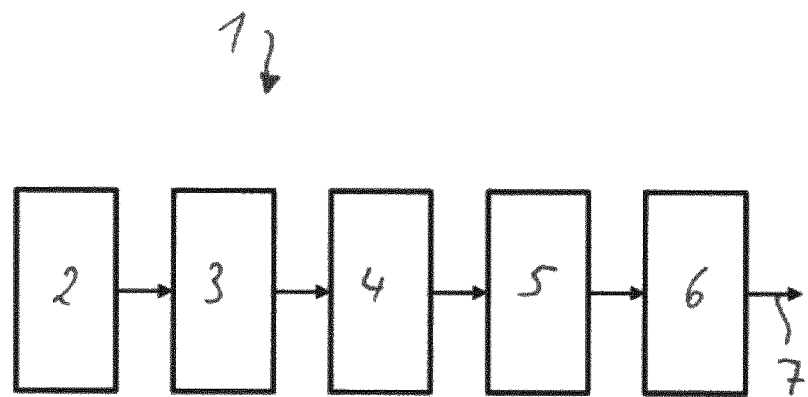
FIG. 1 shows a flowchart illustrating the method according to an embodiment of the invention.

FIG. 1 shows a flowchart 1 that illustrates the method according to an embodiment of the invention. In block 2, the rotational speed of the electric motor that drives the fuel feed pump is detected. In block 3, the actuation current of the electric motor is detected. Both detection operations can take place in a variety of ways by known methods.

In block 4, a pressure value is acquired on the basis of the acquired rotational speed and the acquired actuation current of the electric motor. This pressure value represents the pressure in the fuel which is to be conveyed. Subsequently, in block 5 the acquired pressure value is processed with at least one external state variable. In this context, the processing can take place in a variety of ways. In addition to an offsetting, it is also possible to compare the values or to carry out a correction. The type of processing with the acquired pressure value can vary depending on the external state variable that was used.

Finally, in block 6 the pressure value is corrected. In this context, the previously acquired pressure value is corrected as a function of the processing with the external state variables. The corrected pressure value can then be used again as a basis for further calculations or processing operations. In particular, selective adaptation of the actuation current of the electric motor can take place in order to change the delivery capacity of the fuel feed pump.

The arrow 7 stands symbolically for the passing on of the corrected pressure value to, for example, a further controller. Alternatively, the arrow 7 can also stand for an adapted actuation of the electric motor that has taken place as a function of the corrected pressure value. As a result, a fuel conveying operation that is better adapted to the given boundary conditions can be achieved by the fuel feed pump.

Figure 2:
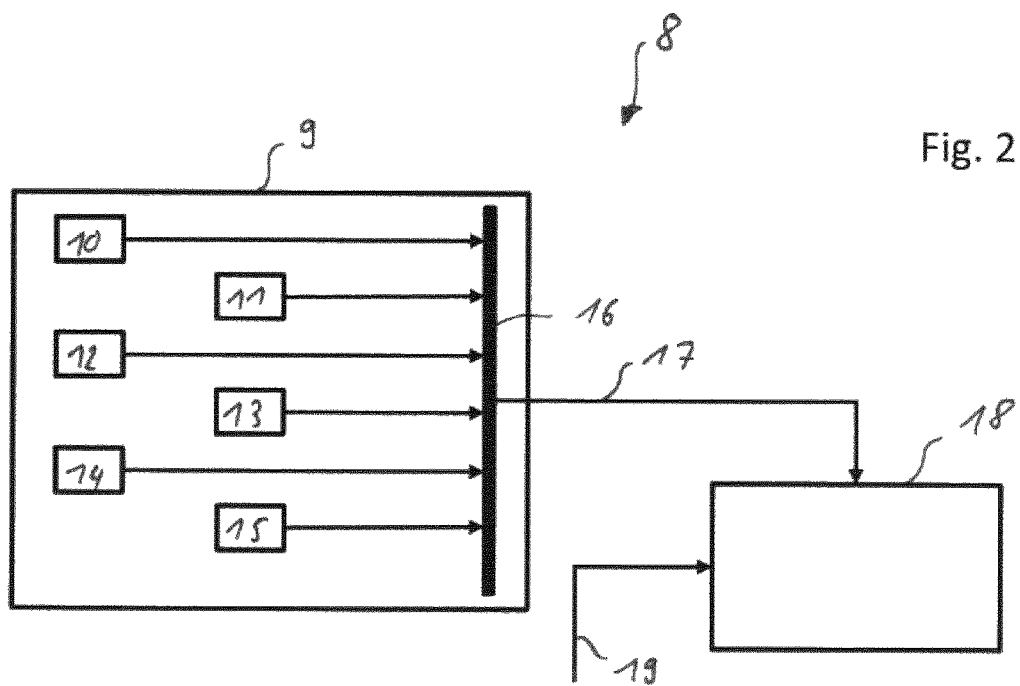
FIG. 2 shows a block diagram which shows, for example, the structure of a model in a simulation program, the transition from external state variables from a vehicle-side model into a controller used to determine the pressure value is shown here.

FIG. 2 shows a schematic overview 8 in the form of a block diagram. FIG. 2 illustrates a block 9 which corresponds to a model such as can be stored in the vehicle, for example in a controller. The block 9 stands symbolically for this model.

Within the block 9, the blocks 10, 11, 12, 13, 14 and 15 are illustrated. These blocks 10 to 15 stand for individual input variables, which can be read into the model 9. The input variables can be formed, as already illustrated in the preceding part of the description, by a wide variety of values, inter alia measured values of sensors or calculated values. Examples here are values such as the rotational speed of the motor, the fuel consumption, the external temperature, the temperature of the fuel high pressure pump or the quality of the fuel.

The input variables are processed within the model 9. These include, in particular, weightings and calculations. The individual values are combined in the bar 16 and passed on individually in a selected form or as a combined signal to the block 18 along the signal conduction path 17.

The block 18 symbolizes a controller that actuates the electric motor of the fuel feed pump. Further state variables or external requirements can also be fed into this controller 18 via the signal line 19. For example the processing of the acquired values for the actuation current of the electric motor and the value of its rotational speed with one or more of the external state variables takes place within the controller 18. Finally, a control signal is fed back to the electric motor from the controller 18, as a result of which the rotational speed of the electric motor can be adapted.

FIGS. 1 and 2 do not have a restrictive character and serve to clarify the inventive concept.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for determining a pressure value in a fluid conveying system of a motor vehicle, the vehicle having an actuable electric motor and having a fluid feed pump drivable by the electric motor, the method comprising:
    determining a rotational speed of the electric motor;
    determining an actuation current of the electric motor;
    acquiring a pressure value as a function of the determined rotational speed and the determined actuation current of the electric motor;
    processing the acquired pressure value with at least one external state variable in a controller (18); and correcting the acquired pressure value based at least in part on the processing of the acquired pressure value with at least one external state variable.

2. The method as claimed in claim 1, further comprising adapting, by the controller (18), the actuation current of the electric motor as a function of the at least one external state variable and/or the acquired pressure value and/or the corrected pressure value.

3. The method as claimed in claim 1, wherein the at least one external state variable comprises a plurality of external state variables formed at least partially by measurement variables and/or calculated variables from other controllers and/or sensors of the motor vehicle.

4. The method as claimed in claim 1, wherein the at least one external state variable comprises a plurality of external state variables and the external state variables originate from models (9), wherein different external state variables can be output by the models (9) as a function of predefinable input variables.

5. The method as claimed in claim 4, wherein the models (9) from which the external state variables originate corresponds to a characteristic diagram stored as an emergency running program for the motor vehicle.

6. The method as claimed in claim 5, wherein each model (9) is used to infer unknown variables from known variables, and wherein each model (9) has empirically acquired data records and/or data records acquired by simulation, to determine the unknown variables.

7. The method as claimed in claim 3, further comprising comparing the acquired pressure value with the external state variables to determine a limitation of a working range of the fluid conveying system.

8. The method as claimed in claim 7, further comprising calibrating the fluid conveying system based on the comparison of the external state variables with the acquired pressure value.

9. The method as claimed in claim 1, wherein the acquiring of the pressure value is performed as a function of at least one directly input external state variable.

10. The method as claimed in claim 1, further comprising determining an internal state variable of the fluid conveying system indirectly as a function of the at least one external state variable.

11. The method as claimed in claim 1, wherein the acquired pressure value corresponds to the pressure in the fluid to be conveyed at an output of the fluid feed pump and/or at a location downstream of the fluid feed pump and/or at a location upstream of the fluid feed pump.

* * * * *